(12) United States Patent
Andrieux et al.

(10) Patent No.: US 10,122,311 B2
(45) Date of Patent: Nov. 6, 2018

(54) SELF-SWITCHING, REVERSIBLE LINEAR ACTUATOR HAVING BIFILAR CONTROL

(71) Applicant: MMT SA, Zug (CH)

(72) Inventors: Gaël Andrieux, Evilard (CH); Antoine Foucaut, Montarlot lès Rioz (FR)

(73) Assignee: MMT SA, Zug (CH)

( * ) Notice: Subject to any disclaimer, the term of this patent is extended or adjusted under 35 U.S.C. 154(b) by 0 days.

(21) Appl. No.: 15/310,593

(22) PCT Filed: Jun. 2, 2015

(86) PCT No.: PCT/EP2015/062205
§ 371 (c)(1),
(2) Date: Nov. 11, 2016

(87) PCT Pub. No.: WO2015/185528
PCT Pub. Date: Dec. 10, 2015

(65) Prior Publication Data
US 2017/0085203 A1 Mar. 23, 2017

(30) Foreign Application Priority Data
Jun. 3, 2014 (FR) .................................... 14 55021

(51) Int. Cl.
*H02P 25/064* (2016.01)
*H02P 6/08* (2016.01)
(Continued)

(52) U.S. Cl.
CPC ............ *H02P 25/064* (2016.02); *H02K 7/06* (2013.01); *H02K 11/215* (2016.01); *H02P 6/08* (2013.01);
(Continued)

(58) Field of Classification Search
CPC .... F16K 31/043; F16K 31/535; F16K 31/046; H02K 7/06; H02K 29/03; H02K 29/08;
(Continued)

(56) References Cited

U.S. PATENT DOCUMENTS

| 4,501,981 A | * | 2/1985 | Hansen | ................. | H02K 37/14 310/209 |
| 5,136,194 A | | 8/1992 | Oudet et al. | | |

(Continued)

FOREIGN PATENT DOCUMENTS

JP 2013018449 A 1/2013

*Primary Examiner* — Bentsu Ro
(74) *Attorney, Agent, or Firm* — Harness, Dickey & Pierce, PLC

(57) ABSTRACT

A mechatronic assembly for linearly driving a member includes a control unit and an actuator, the control unit including a control algorithm and a power bridge, the algorithm controlling the power bridge, the power bridge providing a bifilar electrical signal consisting of a torque signal and a direction signal, the actuator including an electric motor which does not have an N-phase multiphase brush, binary probes for detecting the position of the rotor of the motor, a device for transforming the rotational movement of the rotor into a linear movement of the control member, power switches capable of powering the N phases of the motor on the basis of the bifilar electrical signal, and the state of the power switches is controlled directly by a signal from the detection probes.

26 Claims, 8 Drawing Sheets

(51) Int. Cl.
  *H02P 6/16* (2016.01)
  *H02K 7/06* (2006.01)
  *H02K 11/215* (2016.01)
  *H02P 23/24* (2016.01)
  *H02P 23/30* (2016.01)
  *H02P 23/00* (2016.01)
  *H02K 29/06* (2006.01)

(52) U.S. Cl.
  CPC ............ *H02P 6/16* (2013.01); *H02P 23/0004* (2013.01); *H02P 23/0077* (2013.01); *H02P 23/24* (2016.02); *H02P 23/30* (2016.02); *H02K 29/06* (2013.01)

(58) Field of Classification Search
  CPC . H02K 37/14; G05B 1/02; G05B 1/03; G05D 7/0623; G05D 7/0629; H01F 21/06; H01F 38/18; H01F 7/08; F01L 13/0015
  USPC .................................. 318/38, 119, 135, 687
  See application file for complete search history.

(56) References Cited

U.S. PATENT DOCUMENTS

| | | | |
|---|---|---|---|
| 5,528,139 A | 6/1996 | Oudet et al. | |
| 5,903,117 A | 5/1999 | Gregory | |
| 6,043,645 A | 3/2000 | Oudet et al. | |
| 6,236,125 B1 | 5/2001 | Oudet et al. | |
| 6,563,412 B2* | 5/2003 | Paris | H01F 21/06 310/260 |
| 6,786,465 B1* | 9/2004 | Beswick | F16K 31/535 251/129.11 |
| 7,114,700 B2* | 10/2006 | Beswick | F16K 31/535 251/129.11 |
| 7,121,240 B2* | 10/2006 | Tani | F01L 1/022 123/321 |
| 7,304,450 B2* | 12/2007 | Prudham | F02D 11/10 318/700 |
| 7,589,445 B2* | 9/2009 | Gandel | H02K 7/06 310/20 |
| 9,684,285 B2* | 6/2017 | Rondot | H02P 6/34 |
| 2002/0167384 A1* | 11/2002 | Paris | H01F 21/06 336/115 |
| 2005/0189508 A1* | 9/2005 | Beswick | F16K 31/535 251/129.11 |
| 2005/0218727 A1* | 10/2005 | Gandel | H02K 7/06 310/80 |
| 2012/0285411 A1 | 11/2012 | Nowak et al. | |
| 2014/0203669 A1 | 7/2014 | Rios-Quesada et al. | |
| 2015/0048694 A1 | 2/2015 | Rios-Quesada et al. | |
| 2015/0159770 A1 | 6/2015 | Foucaut et al. | |
| 2015/0323908 A1* | 11/2015 | Rondot | H02P 6/34 251/129.05 |
| 2017/0194885 A1* | 7/2017 | Rondot | H02P 6/17 |

* cited by examiner

| Ha | Hb | Hc | Q1 | Q2 | Q3 | PhaseA | PhaseB | PhaseC |
|----|----|----|-----|-----|-----|--------|--------|--------|
| 1 | 0 | 1 | ON | OFF | ON | ON | OFF | ON |
| 1 | 0 | 0 | ON | OFF | OFF | ON | OFF | OFF |
| 1 | 1 | 0 | ON | ON | OFF | ON | ON | OFF |
| 0 | 1 | 0 | OFF | ON | OFF | OFF | ON | OFF |
| 0 | 1 | 1 | OFF | ON | ON | OFF | ON | ON |
| 0 | 0 | 1 | OFF | OFF | ON | OFF | OFF | ON |

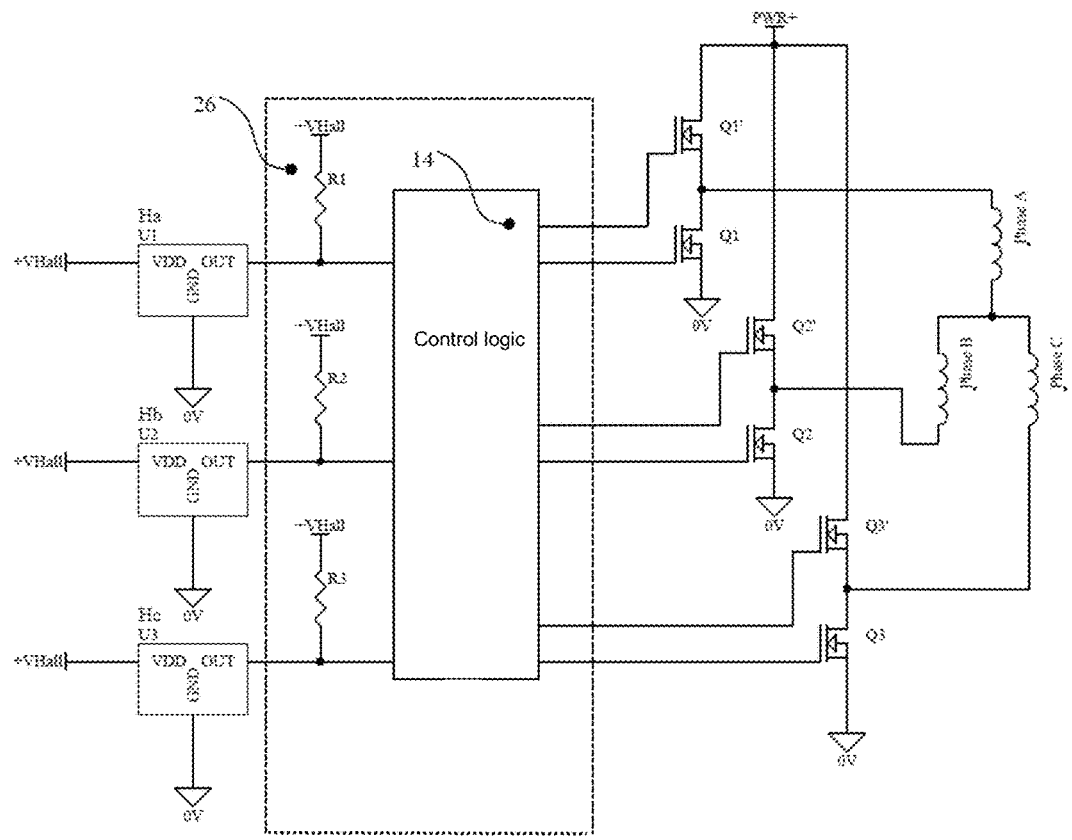

| Direction | Ha | Hb | Hc | Q1 | Q1' | Q2 | Q2' | Q3 | Q3' | Phase A | Phase B | Phase C |
|---|---|---|---|---|---|---|---|---|---|---|---|---|
| 0 | 1 | 0 | 1 | OFF | ON | ON | OFF | OFF | OFF | PWR+ | 0V | ~ |
| 0 | 1 | 0 | 0 | OFF | ON | OFF | OFF | ON | OFF | PWR+ | ~ | 0V |
| 0 | 1 | 1 | 0 | OFF | OFF | OFF | ON | ON | OFF | ~ | PWR+ | 0V |
| 0 | 0 | 1 | 0 | ON | OFF | OFF | ON | OFF | OFF | 0V | PWR+ | ~ |
| 0 | 0 | 1 | 1 | ON | OFF | OFF | OFF | OFF | ON | 0V | ~ | PWR+ |
| 0 | 0 | 0 | 1 | OFF | OFF | ON | OFF | OFF | ON | ~ | 0V | PWR+ |
| 1 | 1 | 0 | 1 | ON | OFF | OFF | ON | OFF | OFF | 0V | PWR+ | ~ |
| 1 | 1 | 0 | 0 | ON | OFF | OFF | OFF | OFF | ON | 0V | ~ | PWR+ |
| 1 | 1 | 1 | 0 | OFF | OFF | ON | OFF | OFF | ON | ~ | 0V | PWR+ |
| 1 | 0 | 1 | 0 | OFF | ON | ON | OFF | OFF | OFF | PWR+ | 0V | ~ |
| 1 | 0 | 1 | 1 | OFF | ON | OFF | OFF | ON | OFF | PWR+ | ~ | 0V |
| 1 | 0 | 0 | 1 | OFF | OFF | OFF | ON | ON | OFF | ~ | PWR+ | 0V |

Figure 5

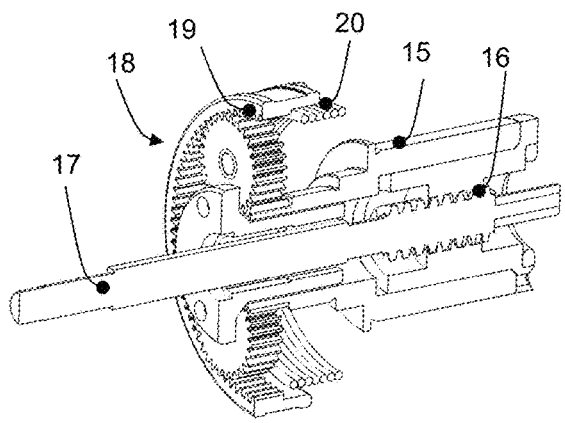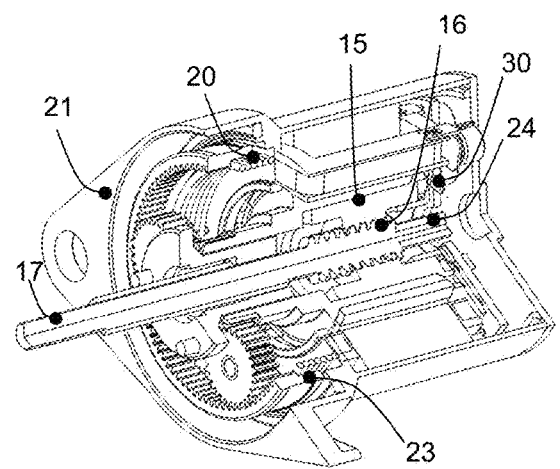
Figure 6a        Figure 6b
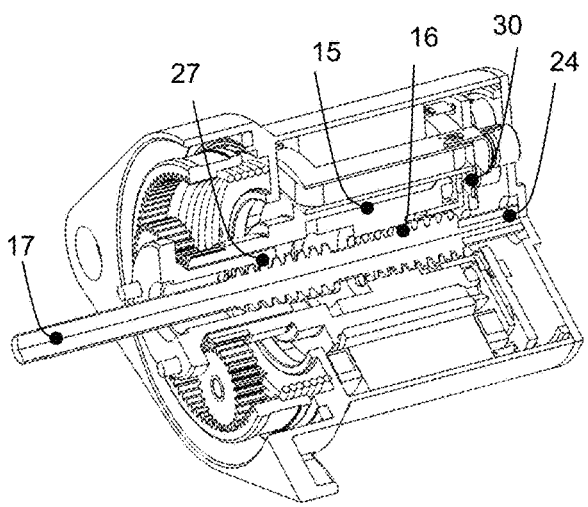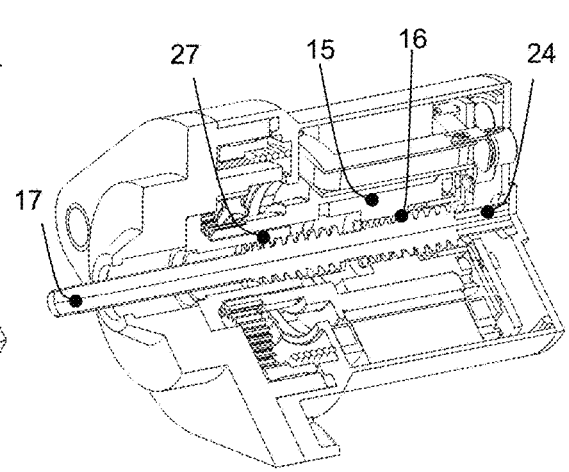
Figure 7a        Figure 7b

SELF-SWITCHING, REVERSIBLE LINEAR ACTUATOR HAVING BIFILAR CONTROL

CROSS-REFERENCE TO RELATED APPLICATIONS

This application is a National Phase Entry of International Patent Application No. PCT/EP2015/062205, filed on Jun. 2, 2015, which claims priority to French Patent Application Serial No. 1455021, filed on Jun. 3, 2014, both of which are incorporated by reference herein.

TECHNICAL FIELD

The present invention relates to the field of linear electric actuators, for example for controlling rates of fluid circulating in heat engines of cars, and more specifically to the field of reversible actuators requiring a safe return to a reference position, a so-called "fail-safe" function, to control the fluid rate upon power shut-off by the battery. The invention specifically relates to a self-switching reversible linear actuator with a bifilar control with interesting qualities as regards compactness, useful power, endurance, temperature behaviour and cost which are better than the actuators described in the state of the art.

BACKGROUND

Fluid metering valves are already known, which comprise a reversible actuator consisting in the association of a direct current motor or gear motor with a cam transformation system to generate a linear movement and control a regulation rate by more or less pushing a valve away from the seat thereof. Such combinations of the state of the art are based on various solutions for motors or gear motors:

A first solution consists in using a direct current motor with a brush combined with a reduction gearing and a cam transformation system to generate the axial displacement of the valve, as disclosed, for example, in the U.S. Patent Publication No. 2012/0285411. This first solution has the advantages of a significant movement reduction and thus an interesting power reserve, simple control using a bifilar connection, the absence of any other smart electronic member. Such solution is interesting as regards costs and capacity to work at high temperatures.

But this solution has two major drawbacks relating to the mechanical switching of electrical signals, which results in the brushes wearing and thus a limited service life, as well as significant electromagnetic emissions which affect the other electronic members nearby. Both drawbacks are more and more a problem for the new specifications of electric actuator for automobiles. On the one hand, always longer service lives are expected from the motors, and on the other hand, the quantity and proximity of electric actuators in motors require a reduction in electromagnetic emissions. Eventually, the spatial configuration of the solution is not very advantageous since it requires positioning the gear motor along an axis perpendicular to the axis of the actuator output member, which leads to a delicate integration on the vehicle engine block.

A second type of solution is based on a torque motor, which is a second (brushless) direct-current motor, which drives a cam device to generate the translation of a valve as disclosed, for example in patent FR2978998. Such solution has the same advantages, as regards a simple control, relative to the bifilar control of the previous solution since it is also based on a direct-current motor, and it additionally takes advantage of the absence of brushes, which increases their service lives, since no brush wears, as compared to the previous solution. Eventually, such solution is thus interesting because of the extended service life and the low electromagnetic emissions resulting from the absence of brushes, because working at high temperatures is possible thanks to the absence of smart and thus binding (as regards cost) electronic components, and because control, which remains bifilar, is simple.

But it also has the drawback of being based on an actuator with a limited travel, which prohibits any kind of reduction in the movement upstream of the cam transformation system, which is a significant obstacle, as regards the maximum forces which can be reached. As a matter of fact, the forces obtained with the second solution are half those obtained with the first family of solutions for a higher power consumption. Similarly to the actuators of the previous family, the perpendicular orientation of the torque motor relative to the output member results in a delicate integration of the actuator, because of the transformation by a cam roller.

Eventually, a third family of known solutions for such reversible actuators for fluid regulation valve control, consists in using an electronically-switched polyphase motor, also currently referred to as a BLOC (for Brushless DC) motor, which corresponds to a brushless polyphase motor, the electronic switching of which, inside the control device, makes it possible to control the electric signals in the phases of the stator, according to the position of the rotor, which is measured by magneto-sensitive sensors. Such motor is associated with a screw-nut transformation system to generate the translation of the valve control member, according to a movement coaxial with that of the motor. In this case, the control device is rather complex, since it works in closed loop, to adapt the signals sent to the stator, according to the actual position of the rotor. Such solution is disclosed in several patents, among which the European patent EP1481459.

Such solution has the advantages of being brushless and thus provides the same guaranteed values of durability and low magnetic emission as the previous solution, but also has a sufficient movement reduction to reach high forces similar to those obtained with the solutions of the first family. Eventually, such configuration is interesting as regards integration since the coaxial nature of the movement of the central screw relative to the motor stator results in a globally axisymmetric construction which greatly facilitates the integration thereof on an engine block and provides an advantageous global compactness of the solution.

On the contrary, this solution requires using complex control electronics integrating smart equipment which have to interpret information from the rotor position sensor to control the phases of the stator accordingly. This results in an expensive solution implemented at limited temperature since the micro-controller which manages the control of the motor is limited to 140° C., which is too low for the new environmental constraints for the valves under the hood of a car.

SUMMARY

The present invention aims at remedying the drawbacks of the state of the art by providing a compact solution actuation using a brushless motor controlled by a bifilar signal via a simple set of electronic components enabling utilization at high temperatures, above 140° C. One aim of the invention is to enable a linear output along the axis of rotation of the brushless motor, by using a screw movement transformation system, inside the rotor. The invention also aims at enabling the return to a safe position (currently called the fail-safe function) by using a return spring coupled to a reduction gearing of the planetary type.

For this purpose, the present invention is based on a brushless polyphase motor with electronic switching, integrating a high-performance movement transformation and being able to receive a very compact return device to the reference position, which makes it possible to propose the integration of all the required functions in a coaxial construction. The screw-nut movement reduction device, which may use two nuts and a screw with a double thread, makes it possible to reach a high movement reduction factor as well as high performances to reach a high output power and a good power reserve. The control unit, which is based on a bifilar control from the power bridge to supply the power switches directly controlled by the magneto-sensitive elements for reading the position of the rotor, results in an interesting compromise between conventional self-switching electronics for a brushless motor and a basic control for a motor with a brush. Such an electronic solution is both efficient and inexpensive, and it makes it possible to work at high temperatures since it uses no on-board intelligence.

Eventually, coupling a planetary reduction gearing and a torsion spring enables a very compact integration of an efficient solution of returning the motor to the reference position. As a matter of fact, the planetary reduction gearing makes it possible to reduce the angular path of the rotor, which may reach several revolutions, to drive a hub over a limited travel and thus operate a torsion spring in good conditions without being affected by the parasitic frictions of the turns which occur when the amplitude of the angular movement is above 270°. The torsion spring consists of a few windings of a wire, on a diameter positioned about the rotor guide and enables integration in the actuator, without extending or expanding its initial size. This also makes it possible to keep a coaxial construction, which can be more easily integrated into the motor environment.

In its broadest sense, the invention relates to a mechatronic assembly for the linear drive of a member comprising a control unit and an actuator, with the control unit comprising a control algorithm and a power bridge, with said algorithm controlling said power bridge, with the power bridge outputting a bifilar electric signal consisting of a torque signal and a direction signal, with the actuator comprising a polyphase brushless electric motor having N phases, binary probes for detecting the position of the rotor of said motor, a device for transforming the rotary movement of the rotor into a linear movement of the control unit, power switches suitable for supplying the N phases of the motor from the bifilar electric signal, characterised in that the state of the power switches is directly controlled by a signal emitted by the detection probes. "Directly controlled" means the detection probes are electrically connected to the output switches and not to a micro-controller. The electric signal sent to the switches is the detection probes output signal. The only electric components, if any, mounted between one probe and one switch are passive components such as a resistor, a capacitor, or a diode. Advantageously, the N-phase polyphase motor consists of N unipolar or bipolar coils, or N*2 unipolar half-coils.

According to an alternative solution, the binary probes for detecting the position of the rotor are supplied by the bifilar electric signal. According to another alternative solution, the movement transformation device has at least one nut connected to the rotor of the motor and at least one threaded portion connected to the actuator control member and in that the rotor drives a position-return device through a planetary reduction gearing. According to another alternative solution, the movement transformation device has at least one nut connected to the rotor and a second nut connected to the stator case, with each one cooperating with two portions of the control member having threads in opposite directions and in that the rotor drives the position-return device through a planetary reduction gearing.

According to another alternative solution, the mechatronic assembly comprises a position sensor comprising a magnet connected to the control member and a magneto-sensitive element connected to the control unit, and the magneto-sensitive element is so designed as to be able to read the axial position of the control member. According to another alternative solution, it comprises a position sensor comprising a magnet connected to the control member and a magneto-sensitive element connected to the control unit and the magnetization pattern of the magnet is so designed as to enable to read the axial position of the control member during the helical movement thereof. Such assembly preferably comprises a position sensor comprising a magnet connected to the control member and a magneto-sensitive element connected to the control unit and the magnetization pattern of the magnet is axisymmetric.

The invention also relates to a mechatronic assembly for the linear drive of a member comprising a control unit and an actuator, with the control unit comprising a control algorithm and a power bridge, with said algorithm controlling said power bridge, with the power bridge outputting a bifilar electric signal consisting of a torque signal and a direction signal, with the actuator comprising a polyphase brushless electric motor having N phases, binary probes for detecting the position of the rotor of said motor, a device for transforming the rotary movement of the rotor into a linear movement of the control unit, power switches suitable for supplying the N phases of the motor from the bifilar electric signal, characterised in that the state of the power switches is directly controlled by a signal emitted by the detection probes. The N-phase polyphase motor preferably consists of N unipolar or bipolar coils, or N*2 unipolar half-coils.

According to an advantageous embodiment, the binary probes for detecting the position of the rotor are supplied by the bifilar electric signal. The movement transformation device advantageously has at least one nut connected to the rotor of the motor and at least one threaded portion connected to the actuator control member and the rotor drives a position-return device through a planetary reduction gearing. The movement transformation device preferably has at least one nut connected to the rotor and a second nut connected to the stator case, with each one cooperating with two portions of the control member having threads in opposite directions and the rotor drives the position-return device through a planetary reduction gearing.

According to another alternative solution, the mechatronic assembly comprises a position sensor comprising a magnet connected to the control member and a magneto-sensitive element connected to the control unit and the magneto-sensitive element is so designed as to be able to read the axial position of the control member. It preferably comprises a position sensor comprising a magnet connected to the control member and a magneto-sensitive element connected to the control unit, and the magnetization pattern of the magnet is so designed as to enable to read the axial position of the control member during the helical movement thereof. According to another alternative solution, the mechatronic assembly comprises a position sensor comprising a magnet connected to the control member and a magneto-sensitive element connected to the control unit and the magnetization pattern of the magnet is axisymmetric. The winding axis of the torsion spring is advantageously concentric with the axis of rotation of the polyphase engine. According to another alternative solution, the angular path of the torsion spring 20 is mechanically limited by a protrusion connected to the spring itself or to one of the elements of the planetary reduction gearing 18 moving in a limited circular space.

BRIEF DESCRIPTION OF THE FIGURES

Other characteristics and advantages of the invention will appear in the description that follows relative to detailed embodiments, and referring to the attached figures that represent respectively:

FIG. 5, an example of an electronic circuit of the switching logic and its truth table, for a bipolar controlling mode, in a second embodiment;

FIGS. 6*a* and 6*b*, a first embodiment of the linear actuator integrating a screw-nut system;

FIGS. 7*a* and 7*b*, a second embodiment of the linear actuator integrating a screw-nut system as well as a reference position-return system;

DETAILED DESCRIPTION

Figure 1:
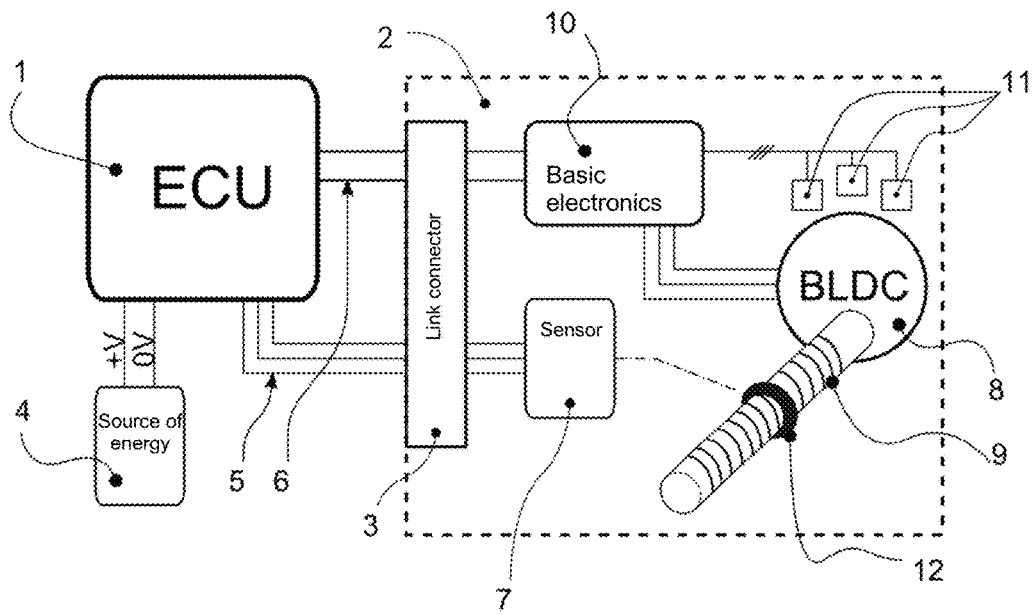
FIG. 1, a typical mechatronic architecture used for controlling via a bifilar control of a motor according to the invention.

FIG. 1 shows a mechatronic assembly according to the invention consisting of a source of energy 4 supplying a control unit 1 controlling an actuator 2 consisting of a brushless DC motor 8 associated with a mechanical assembly for mechanically transforming 9 the rotation into a linear displacement, and the assembly is symbolized here as a system of the screw-nut type. A sensor 7, coupled to the mechanical output 12, here the nut, of the actuator 2, sends the position information 5 back to the control unit 1 which acts on the control signals 6 grouped in a link connector 3. The position of the motor rotor 8 is read using N probes 11 which self-switch the N phases of the motor 8, via a basic electronic circuit 10.

Figure 2:
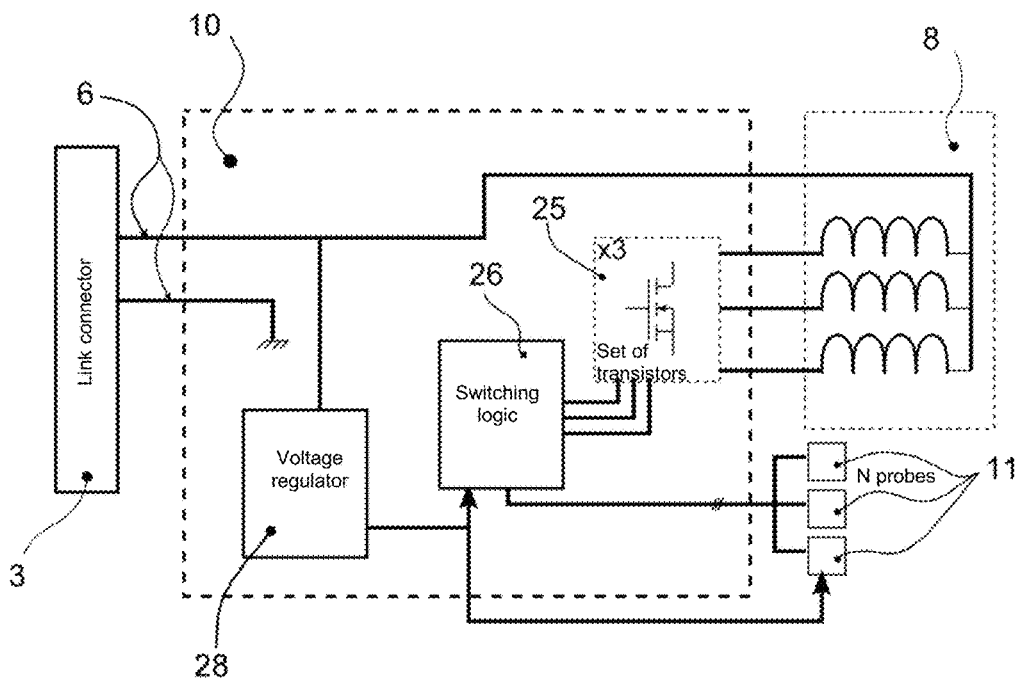
FIG. 2, the detail of a basic electronic circuit which may be used in the invention.

FIG. 2 shows the basic electronics 10 which may be used in the invention. It consists of a set of control transistors 25 directly controlled by the signals output by the Hall probes 11 detecting the position of the rotor of the motor via a switching logic 26, consisting of simple electronic elements with no microprocessor. A voltage regulator 28 makes it possible to use the bifilar control signal to supply the 30 Hall probes 11.

Figure 3A:
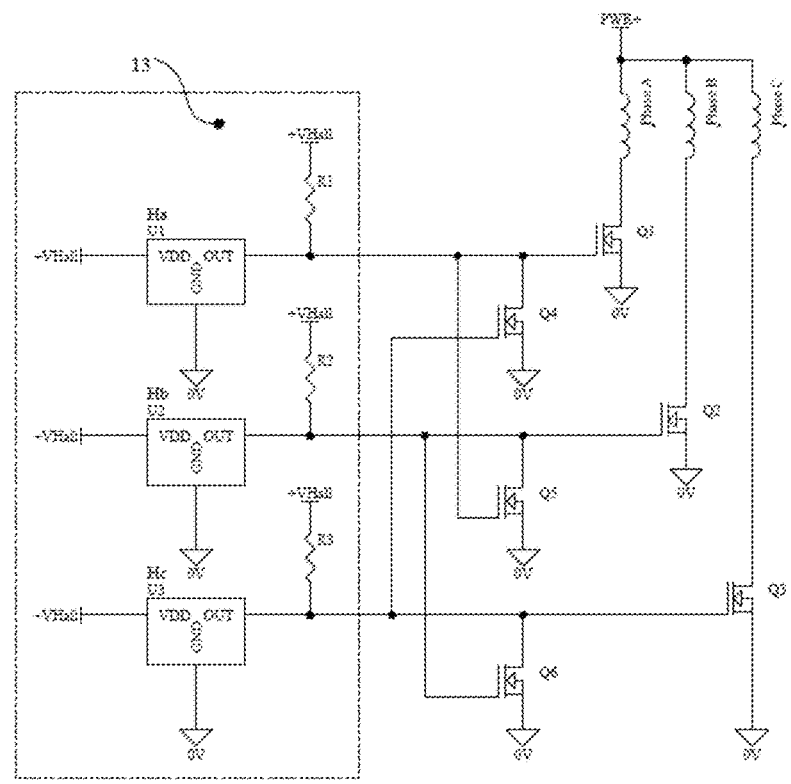
FIG. 3*a*, an example of an electronic circuit of the switching logic in a first "120° unipolar" operation mode and its truth table.

FIG. 3*a* shows an exemplary control in a first so-called "120°" unipolar controlling mode of a star-connected three-phase motor. As voltage (PWR+) is positive on the common point, current always circulates in the same direction, in the windings. Voltage from the voltage regulator 28, output by the bifilar control, supplies the detection block 13 and the Hall probes Ha, Hb, Hc. Depending on the position of the rotor, the various digital probes are in the low state (equivalent to null voltage) or the high state (5V type voltage). Depending on the state of the probes, the various transistors Q1 to Q6 are open or closed and thus enable, or not, the circulation of current in the various phases. The controlling mode which can be obtained with the example of FIG. 5 is driving in a 120° mode, i.e. each phase is supplied for 120° electrical degrees (one electrical degree is equal to one mechanical degree multiplied by the number of pairs of poles in the motor magnet).

Figure 3B:
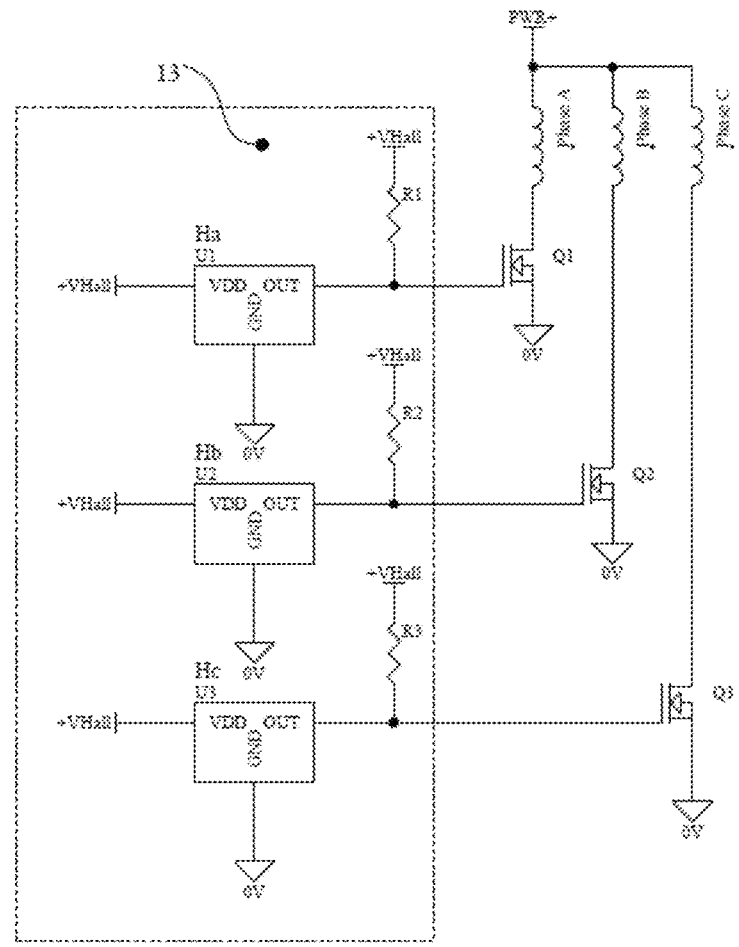
FIG. 3*b*, an example of an electronic circuit of the switching logic in a second "180° unipolar" operation mode and its truth table.

Similarly, FIG. 3*b* shows an exemplary "180°" unipolar control. Transistors Q1 to Q3 are open or closed, depending on the state of the Hall probes, supplied by the regulated bifilar signal. The transistors are open/closed over 180° electrical degrees. Controlling in 120° or 180° mode can be selected according to the number of authorized control transistors or the profile and torque level expected for the motor.

Figure 4:
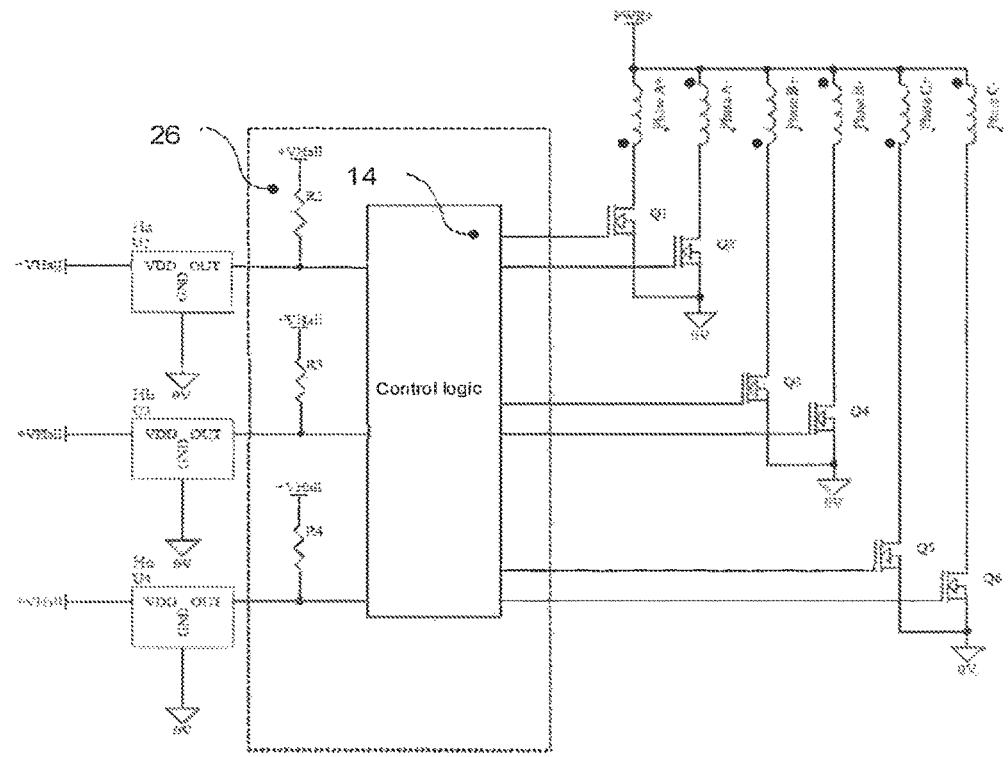
FIG. 4, an example of an electronic circuit of the switching logic and its truth table for a bipolar controlling mode, in a first embodiment.

Controlling the motor in a bipolar mode (circulation of current in both directions, in each phase) is possible. For this purpose, two different coils just have to be provided per phase, with each one being coiled in one direction. The A+ coil is thus coiled in the direction opposite that of the A− coil, as per the example of FIG. 4 and the A phase. When transistor Q1 is open and Q2 is closed, current circulates in the A− phase and the magnetic field in the phase is oriented in a first direction. On the contrary, when transistor Q1 is closed and Q2 is open, current circulates in the A+ phase and the magnetic field in the phase is oriented in a second direction opposite the first direction. The same is true for the two other B and C phases of the example shown in FIG. 4. In order to correctly sequence the opening and closing of the transistors Q1 to Q6, the switching logic block 26 must be provided with an adapted control logic 14, consisting of simple electronic elements such as logic gates which make it possible to obtain the truth table shown. The complete electronic diagram is not shown for reasons of clarity, but can easily be considered by the persons skilled in the art.

It should be noted that a bipolar connection of the motor coils can be provided, as explained in FIG. 5, while keeping 6 power transistors. The control logic 14 is adapted to the corresponding truth table shown in FIG. 5.

FIG. 6*a* shows a sectional view of a linear actuator according to the invention, which comprises a brushless polyphase motor 8, integrating a rotor and a stator. The front face of the stator case 21 carries an electronic circuit 10 comprising a bifilar controlling device as described above. The rotor 15 carries a magnet 34 so designed as to be able to excite digital probes 11 positioned on the electronic circuit 10, and integrates a nut 16, the rotation of which causes the translation of the central axis 17, the rotation of which is locked using a sliding link with the front flange 29. According to the control logic disclosed above, the digital probes 11 make it possible to self-switch the stator phases, and the pins linked to the control signals 6 of the motor consist of two power supply leads only. Besides, the central axis 17 which is mobile in translation, carries a magnet 24 so designed as to be able to excite a magneto-sensitive element 30 positioned on the front face of the electronic card 10, so as to give position information 5 (not shown in FIG. 6a, only in 6b) of the control member. The sensor, supplied by two power supply leads separate from those of the motor, issues information 5 on the position of the central axis 17 which enables a control unit outside the actuator, to check the position of the central axis 17 by comparing the actual position thereof with the desired set position. As shown in FIG. 6b, the actuator has a link connector 3 which comprises five electrical connections only: 2 of the connections are the control signals 6 of the motor and the other 3 connections are the position sensor supply, and the output signal thereof, as position information 5.

FIGS. 7a, showing a separate view of the rotor 15 with a planetary reduction gearing 18, and 7b, showing a sectional view of the complete motor, relate to a second embodiment of the linear actuator according to the invention, wherein the rotor 15 of the polyphase motor integrates a nut 16 which cooperates, on the one hand, with a threaded portion of the central axis 17 composing the control member, and, on the other hand, with a planetary reduction gearing 18 consisting of 3 satellites positioned about the rotor 15 by driving an internal spur gear 19 which itself drives the torsion spring 20.

The central axis 17 is slidingly connected to the front flange 21 of the actuator case, so that the rotation of the rotor 15 nut 16 causes the translation of the central axis 17. The rotation of the rotor 15 results in the loading of the torsion spring 20, the travel of which is limited by the internal spur gear 19, which has a pin which circulates inside a notch (not shown in FIG. 6b) connected to the actuator case. The range of the circular movement of the spring 20 is thus significantly reduced relative to the movement of the rotor 15 thanks to the reduction of such planetary reduction gearing 18 and enables a small deformation of the spring 20 and thus avoids the friction loss of the spring 20 on its chafing sleeve 23. The rotor 15 torque is transformed in a translation of the control member through the screw/nut link which thus transmits the mechanical power. The planetary reduction gearing can advantageously be made of plastic since it is used for transmitting the return torque stored in the spring, only, so as to ensure the return of the actuator control member to a reference position. The plastic gears of the planetary reduction gearing thus do not transmit the effective mechanical power at the actuator output, but a limited torque, so calculated as to overcome the magneto-static torque of the rotor 15 and ensure the return to the reference position when the motor is no longer powered. A magnet 24 is connected to the rear end of the central axis 17 and cooperates with a magneto-sensitive element 30, with the magnet 24 and magneto-sensitive element 30 forming a position sensor. The magneto-sensitive element 30 is connected to the motor control device, so that the axial displacement of the control member is read and interpreted by the control device, which can then check that the control member corresponds to the set condition (closed-loop operation).

Figure 8A:
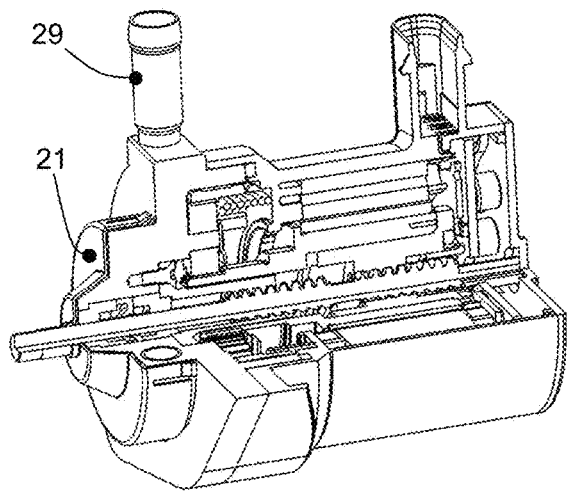
FIGS. 8*a* and 8*b*, a partial sectional view and a three-quarter view of a geared motor according to the invention using a third embodiment of FIGS. 8*a* and 8*b*.
Figure 8B:
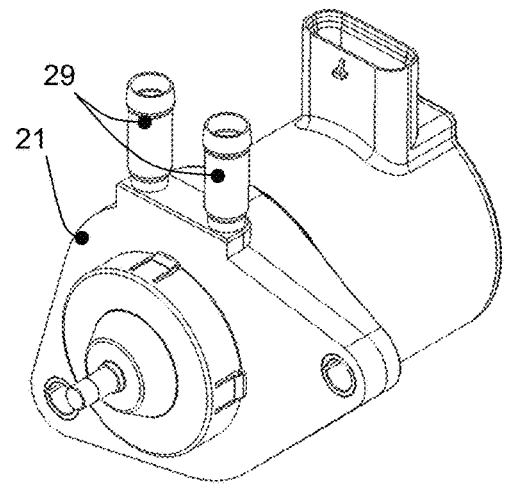

FIGS. 8a and 8b show a third embodiment wherein the movement is transformed using a double-thread screw solution. The rotor 15 has a first nut 16 which cooperates with a first threaded portion of the central axis 17, whereas a second nut 27 connected to the frame cooperates with a second threaded portion of the central axis 17, the hand of helix of which is opposed to the first portion. The rotation of the nut 16 connected to the rotor, thus forces the central axis 17 to engage into the second stationary nut 27, and thus to make an helical movement. The control member of the actuator thus follows an helix and the shape of the valve disk connected to the actuator shall then have to be so designed as to accept such rotation component when dosing the fluid.

The position sensor making it possible to read the axial position of the control member is similar to the one shown in FIGS. 7a and 7b. But it is different therefrom in that the magnet 24 magnetization pattern must be adapted to the relative movement of the magnet 24 relative to the magneto-sensitive element 30 which is helical in the second embodiment. A preferred but not restrictive solution consists in having an axisymmetric magnetization (which is identical during a rotation) on the magnet 24 so that the rotation of the control member is not detected by the magneto-sensitive element 30 forming the sensor.

Figure 9A:
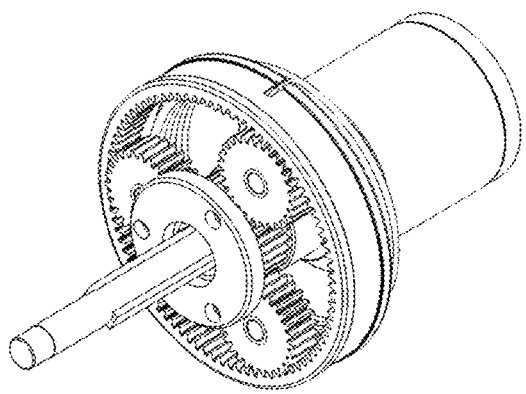
FIGS. 9*a* and 9*b*, a partial sectional view and a three-quarter view of a geared motor according to the invention using the third embodiment of FIGS. 8*a* and 8*b*.
Figure 9B:
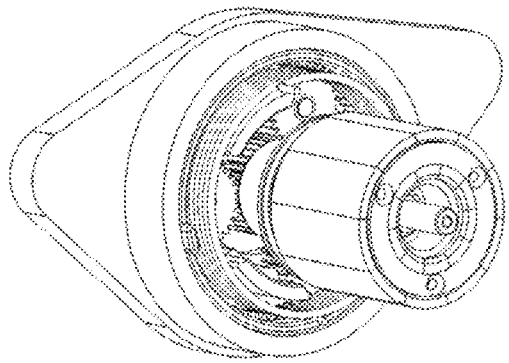

FIGS. 9a and 9b show sectional and perspective views of an actuator according to the embodiment of FIGS. 8a and 8b. Such embodiment combines the control device using simplified electronics, the solution of the transformation of the movement using a double helix coupled to a position sensor of the helical movement of the control member, and eventually a reference position-return device using a torsion spring applying a return torque to the rotor through a planetary reduction gearing co-axially distributed about the rotor. The actuator case consists, on the one hand, of an enclosure 21 overmolded about the stator and a front flange 29 which are separated so that the front part of the actuator comprising the planetary reduction gearing and the spring can be easily modified, without changing the rear part which comprises the motor part and the control electronics.

Figure 10A:
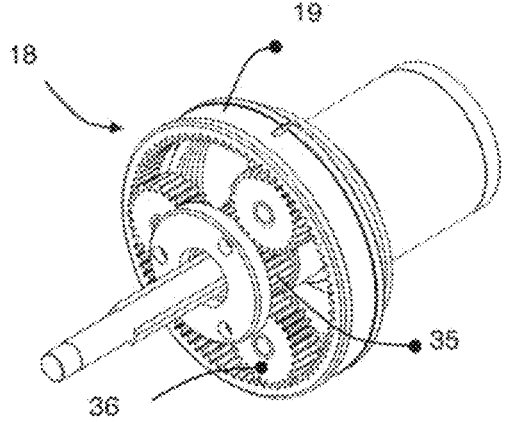
FIGS. 10*a*-10*c* are perspective views, according to the preferred embodiments of FIGS. 8 and 9, showing the position-return solution coupled to the planetary reduction gearing.
Figure 10B:
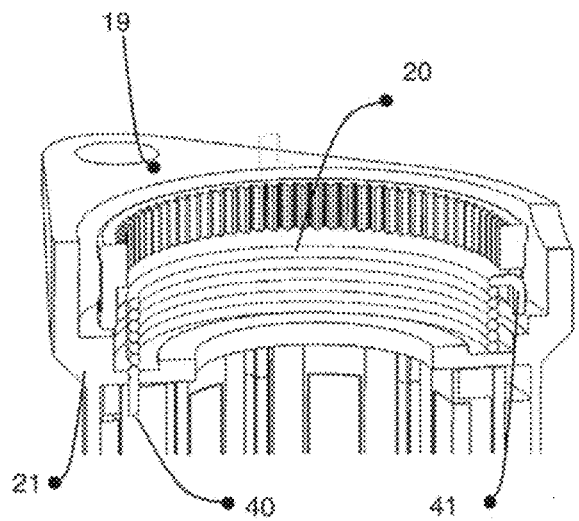
Figure 10C:
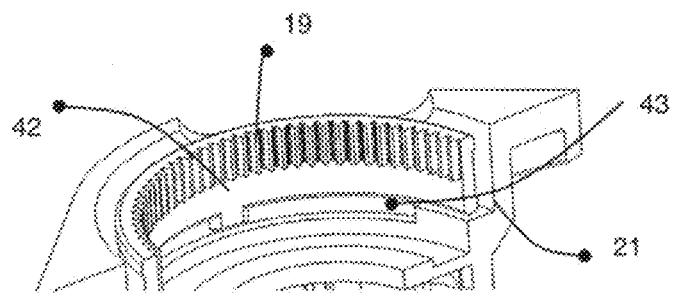

FIGS. 10a, 10b and 10c show in details the original reference position-return solution, which is based on the combination of a torsion spring 20 with a planetary reduction gearing 18. The spring 20 has a stationary fastener 40 fixed on the stator case 21 and a mobile fastener 41 fixed to the internal spur gear 19, which comprises a pin 42, which circulates in a path 43 having a limited length provided in the stator case 21 so as to enable the pre-loading of the spring. The internal spur gear 19 is driven by three planet gears 36 which are driven by the central gear 35 secured to the rotor 15. The ratio of reduction between the movement of the rotor 15, which can reach several revolutions, and the reducing crown 19 is so selected as to limit the working angle of the spring 20 to a reduced travel, of the order of 180 to 270 degrees. The spring coils are thus exposed to a low stress and make it possible to provide a return function with a minimum friction. The planetary reduction gearing 18 can be made of plastic materials since it transmits the spring torque only, and not the motor effective torque which is used, in parallel, by the movement transforming device.

The invention claimed is:

1. A mechatronic assembly for the linear drive of a member comprising a control unit and an actuator, with the control unit comprising a control algorithm and a power bridge, with the algorithm controlling the power bridge, with the power bridge providing a bifilar electric signal including a torque signal and a direction signal, with the actuator comprising a polyphaser brushless electric motor having N phases, binary probes for detecting a position of the rotor of the motor, a transmission transforming rotational movement of the rotor into a linear movement of the control unit, power switches powering the N phases of the motor on the basis of the bifilar electric signal, and a state of the power switches being directly controlled by a signal from the detection probes.

2. A mechatronic assembly according to claim 1, wherein the N-phase polyphaser motor includes N unipolar or bipolar coils, or N*2 unipolar half-coils.

3. A mechatronic assembly according to claim 1, wherein the binary probes for detecting the position of the rotor are powered by the bifilar electric signal.

4. A mechatronic assembly according to claim 1, wherein the movement transformation transmission has at least one nut connected to the rotor of the motor and at least one threaded portion connected to the actuator control member and in that the rotor drives a position-return device through a planetary reduction gearing.

5. A mechatronic assembly according to claim 1, wherein the movement transformation transmission has at least one nut connected to the rotor and a second nut connected to the stator case, with each one cooperating with two portions of the control member having threads in opposite directions and in that the rotor drives the position-return device through a planetary reduction gearing.

6. A mechatronic assembly according to claim 5, further comprising a position sensor comprising a magnet connected to the control member and a magneto-sensitive element connected to the control unit, and the magnetization pattern of the magnet being adapted to read the axial position of the control member during the helical movement thereof.

7. A mechatronic assembly according to claim 5, further comprising a position sensor comprising a magnet connected to the control member and a magneto-sensitive element connected to the control unit, and the magnetization pattern of the magnet being axisymmetric.

8. A mechatronic assembly according to claim 1, further comprising a position sensor comprising a magnet connected to the control member and a magneto-sensitive element connected to the control unit, and the magneto-sensitive element being adapted to read the axial position of the control member.

9. A mechatronic assembly for the linear drive of a member comprising a control unit and an actuator, with the control unit comprising a servo-control algorithm and a power bridge, with the algorithm controlling the power bridge, with the power bridge outputting a bifilar electric signal including a torque signal and a direction signal, with the actuator comprising a polyphase brushless electric motor having N phases, binary probes for detecting a position of the rotor of the motor, a transmission operably transforming rotational movement of the rotor into a linear movement of the control unit, a torsion spring operably returning to the reference position, power switches operably powering the N phases of the motor from the bifilar electric signal, and a state of the power switches being directly controlled by a signal from the detection probes.

10. A mechatronic assembly according to claim 9, wherein the N-phase polyphase motor includes N unipolar or bipolar coils, or N*2 unipolar half-coils.

11. A mechatronic assembly according to claim 9, wherein the binary probes for detecting the position of the rotor are powered by the bifilar electric signal.

12. A mechatronic assembly according to claim 9, wherein the movement transformation transmission has at least one nut connected to the rotor of the motor and at least one threaded portion connected to the actuator control member and in that the rotor drives the position-return spring through a planetary reduction gearing.

13. A mechatronic assembly according to claim 9, wherein the movement transformation transmission has at least one nut connected to the rotor and a second nut connected to the stator case, with each one cooperating with two portions of the control member having threads in opposite directions and in that the rotor drives the position-return spring through a planetary reduction gearing.

14. A mechatronic assembly according to claim 13, further comprising a position sensor comprising a magnet connected to the control member and a magneto-sensitive element connected to the control unit, and the magnetization pattern of the magnet being adapted to read the axial position of the control member during helical movement thereof.

15. A mechatronic assembly according to claim 13, further comprising a position sensor comprising a magnet connected to the control member and a magneto-sensitive element connected to the control unit, and the magnetization pattern of the magnet being axisymmetric.

16. A mechatronic assembly according to claim 9, further comprising a position sensor comprising a magnet connected to the control member and a magneto-sensitive element connected to the control unit, and the magneto-sensitive element being adapted to read the axial position of the control member.

17. A mechatronic assembly according to claim 9, further comprising a winding axis of the torsion spring being concentric with an axis of rotation of the polyphaser motor.

18. A mechatronic assembly according to claim 9, further comprising an angular path of the torsion spring being mechanically limited by a protrusion connected to the spring itself or to one of the elements of the planetary reduction gearing moving in a limited circular space.

19. A mechatronic assembly for a linear drive of a member, the mechatronic assembly comprising:
  a control unit having a control algorithm and a power bridge, the control algorithm configured to control the power bridge, the power bridge configured to output a bifilar electric signal having a torque signal and a direction signal; and
  an actuator having a polyphaser brushless electric motor having N phases, binary probes configured to detect a position of a rotor of the motor, a transmission configured to transform rotational movement of the rotor into a linear movement of the control unit, power switches configured to power the N phases of the motor in response to the bifilar electric signal, and a state of the power switches configured to be directly controlled by a signal from the binary probes.

20. The mechatronic assembly according to claim 19, wherein the N-phase polyphaser motor comprises N unipolar or bipolar coils, or N*2 unipolar half-coils.

21. The mechatronic assembly according to claim 19, wherein the binary probes are powered by the bifilar electric signal.

22. The mechatronic assembly according to claim 19, wherein the transmission comprises at least one nut connected to the rotor of the motor and at least one threaded portion connected to an actuator control member, the rotor configured to drive a position-return device through a planetary reduction gearing.

23. The mechatronic assembly according to claim 19, wherein the transmission comprises a first nut connected to the rotor and a second nut connected to a stator case, each of the first nut and the second nut cooperating with two portions of an actuator control member having threads in opposite directions, the rotor configured to drive a position-return device through a planetary reduction gearing.

24. The mechatronic assembly according to claim 23, further comprising a position sensor having a magnet connected to the actuator control member and a magneto-sensitive element connected to the control unit, a magnetization pattern of the magnet configured to read an axial position of the actuator control member during helical movement thereof.

25. The mechatronic assembly according to claim 23, further comprising a position sensor having a magnet connected to the actuator control member and a magneto-sensitive element connected to the control unit, a magnetization pattern of the magnet being axisymmetric.

26. The mechatronic assembly according to claim 19, further comprising a position sensor having a magnet connected to an actuator control member and a magneto-sensitive element connected to the control unit, the magneto-sensitive element configured to read the axial position of the actuator control member.

* * * * *